Sept. 5, 1944.　　　　P. TATLOW　　　　2,357,561
EPICYCLIC MECHANISM
Filed April 2, 1943
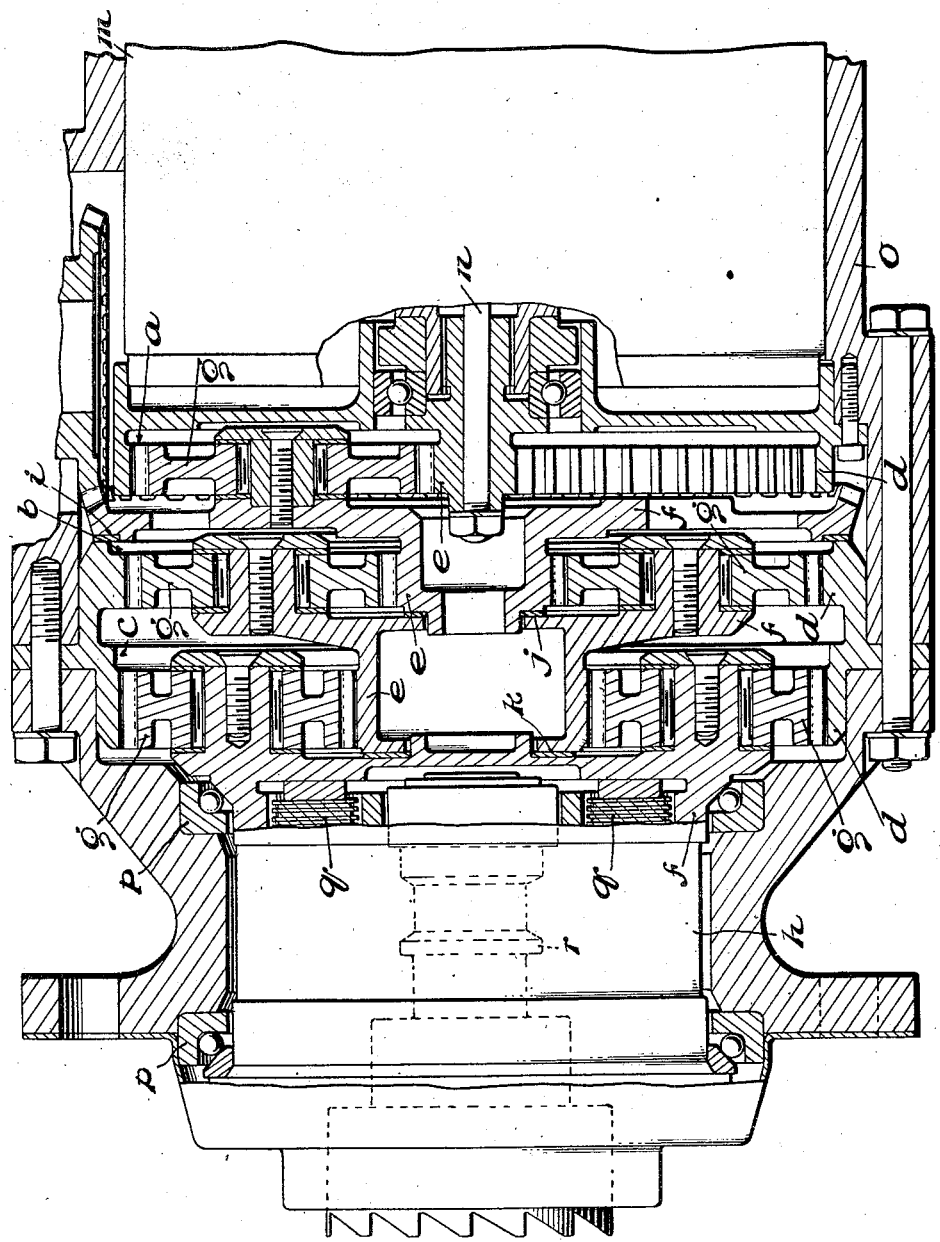
INVENTOR
*Percy Tatlow*
BY
*Martin J. Finnegan* ATTORNEY Patented Sept. 5, 1944

2,357,561

UNITED STATES PATENT OFFICE 2,357,561

EPICYCLIC MECHANISM

Percy Tatlow, London, England, assignor to Rotax Limited, London, England

Application April 2, 1943, Serial No. 481,625
In Great Britain March 7, 1942

1 Claim. (Cl. 74—305)

This invention relates to epicyclic mechanisms and more particularly to engine starting and other apparatus in which an epicyclic mechanism is arranged between and adapted to transmit motion from an electric motor to a shaft or other member to be driven. The object of the invention is to enable a mechanism of the kind consisting of a plurality of epicyclic trains to be arranged in a more compact compass than is practicable on ordinary lines.

The invention comprises an epicyclic mechanism of the kind aforesaid in which the planet pinion carriers of the different trains are mutually supported through the medium of the intermediate pinions and lateral thrust rings.

In particular the invention comprises the combination of an electric motor, a driven member, and an epicyclic mechanism as specified in the preceding paragraph arranged between the said motor and driven member, the whole forming a self-contained unit.

The accompanying drawing is a part sectional side elevation of an engine starting mechanism embodying the invention.

In carrying the invention into effect as shown, I employ an epicyclic mechanism consisting of three similar trains $a$, $b$ and $c$. Each train consists of a fixed internally-toothed annulus $d$, a sun pinion $e$, and a planet carrier $f$ on which are mounted a plurality of equally spaced planet pinions $g$ engaging with both the sun pinion and the annulus. The three trains $a$, $b$, $c$, are arranged side by side and as close together as possible. The sun pinion $e$ of the first train $a$ is the driving member. The sun pinion $e$ of the second train $b$ is formed on or secured to the planet carrier $f$ of the first train $a$, and the sun pinion $e$ of the third train $c$ is formed on or secured to the planet carrier $f$ of the second train. A driven member $h$ may be formed as shown on the planet carrier $f$ of the third train $c$, or may be connected to this carrier through a clutch. The arrangement above described serves as a reduction gear and enables a large speed ratio to be provided between the driving and driven members.

To obtain the desired compactness, that is to say the least possible axial length of the mechanism, I arrange for the planet carriers $f$ to be mutually supported through the medium of the associated sun and planet pinions $e$, $g$, as shown. This obviates the ordinary practice of providing bearings whereby planet carriers of different trains are independently supported on separate bearings which are carried by a central shaft or otherwise. In addition I arrange thin thrust rings or washers between certain parts of the mechanism. Thus, I arrange one such ring $i$ between the face of the planet carrier $f$ of the first train $a$ and the fixed annulus $d$ of the second train $b$, this ring being situated adjacent to the outer periphery of the carrier. Another such ring $j$ is placed between the end face of the sun pinion $e$ of the second train $b$ and the adjacent face of the planet carrier $f$ of this train. Likewise a third such ring $k$ is placed between the end face of the sun pinion $e$ of the third train $c$ and the adjacent face of the planet carrier $f$ of this train.

By arranging for the mutual support of the planet carriers $f$, as above described I am able to obtain the desired compactness in a very simple and convenient manner.

In the construction of the engine starting mechanism shown in the drawing, I mount the epicyclic mechanism above described at one end of and coaxially with an electric motor $m$, the driving sun pinion $e$ of the first train $a$ being formed on or secured to one end of the motor armature spindle $n$. The annuli $d$ are secured within one end of the same casing $o$ as the motor $m$, and in the end of the casing remote from the motor are provided bearings $p$ for the driven member $h$ formed on the planet carrier $f$ of the third train $c$, this member being of hollow cylindrical form. Within the member $h$ is arranged a clutch $q$ of the multi-plate type, and this latter is adapted to transmit motion to a final driven shaft $r$ situated within the said member, the latter shaft being adapted to be engaged with the shaft of the engine to be started. The whole assembly consisting of the motor, epicyclic reduction mechanism and driven members form a compact and self-contained unit.

My improved epicyclic mechanism, or the combination consisting of an electric motor, epicyclic mechanism and a driven member may, however, be applied to other uses. My invention is therefore not limited to the example described, and subordinate constructional details may be varied to suit different requirements.

Having thus described my invention what I claim as new and desired to secure by Letters Patent is:

In mechanism of the class described, at least a ternary of gear trains each comprising intermeshing sun and planet pinions and a stationary ring gear encompassing said pinions and in meshed relation with said planet pinions, the sun pinions of a pair of said trains and the planet pinions of a different pair of said trains being interdependent for mutual support and position within the confines of their respective trains, lateral thrust means incorporated within said ternary and coacting with said last-mentioned sun and planet pinions to maintain their positions within their respective trains without axial support, the sun pinion of the other train adapted for unitary rotation with a driving device for driving said ternary, and means rotatably carrying the planet pinions of the remaining train and adapted for effecting driving relation between said ternary and a driven device.

PERCY TATLOW.